United States Patent [19]
Cullen

[11] Patent Number: 6,009,692
[45] Date of Patent: Jan. 4, 2000

[54] ROTOR FOR A BAGGING MACHINE HAVING QUICK CHANGE ROTOR TEETH

[75] Inventor: Steven R. Cullen, Astoria, Oreg.

[73] Assignee: Versa Corp., Astoria, Oreg.

[21] Appl. No.: 09/075,032

[22] Filed: May 8, 1998

[51] Int. Cl.[7] ............................ B65B 43/26; B65G 33/30
[52] U.S. Cl. ........................ 53/570; 53/527; 100/144; 141/114; 198/664; 198/677
[58] Field of Search ................. 100/65, 117, 144, 100/145; 53/201, 527, 529, 567, 570, 576; 141/71, 73, 114; 198/642, 662, 664, 676, 677

[56] References Cited

U.S. PATENT DOCUMENTS

| 28,298 | 5/1860 | Perry ........................................ 100/145 |
|---|---|---|
| 307,904 | 11/1884 | Bing .......................................... 198/664 |
| 1,073,425 | 9/1913 | Lambert ..................................... 198/664 |
| 3,751,015 | 8/1973 | Hensen et al. ............................ 100/145 |
| 4,320,828 | 3/1982 | Teske ........................................ 198/642 |
| 4,907,503 | 3/1990 | Ryan . | |
| 5,429,581 | 7/1995 | Michaud et al. ......................... 198/677 |
| 5,503,066 | 4/1996 | Koskela et al. . | |

*Primary Examiner*—Stephen F. Gerrity
*Attorney, Agent, or Firm*—Zarley, McKee, Thomte, Vorhees & Sease; Dennis L. Thomte

[57] ABSTRACT

A rotor for a bagging machine comprising an elongated, cylindrical body having a horizontally disposed rotational axis. A plurality of sockets are provided on the cylindrical body in a spaced-apart relationship with respect to each other. A rotor tooth is selectively removably received by each of the sockets.

8 Claims, 4 Drawing Sheets

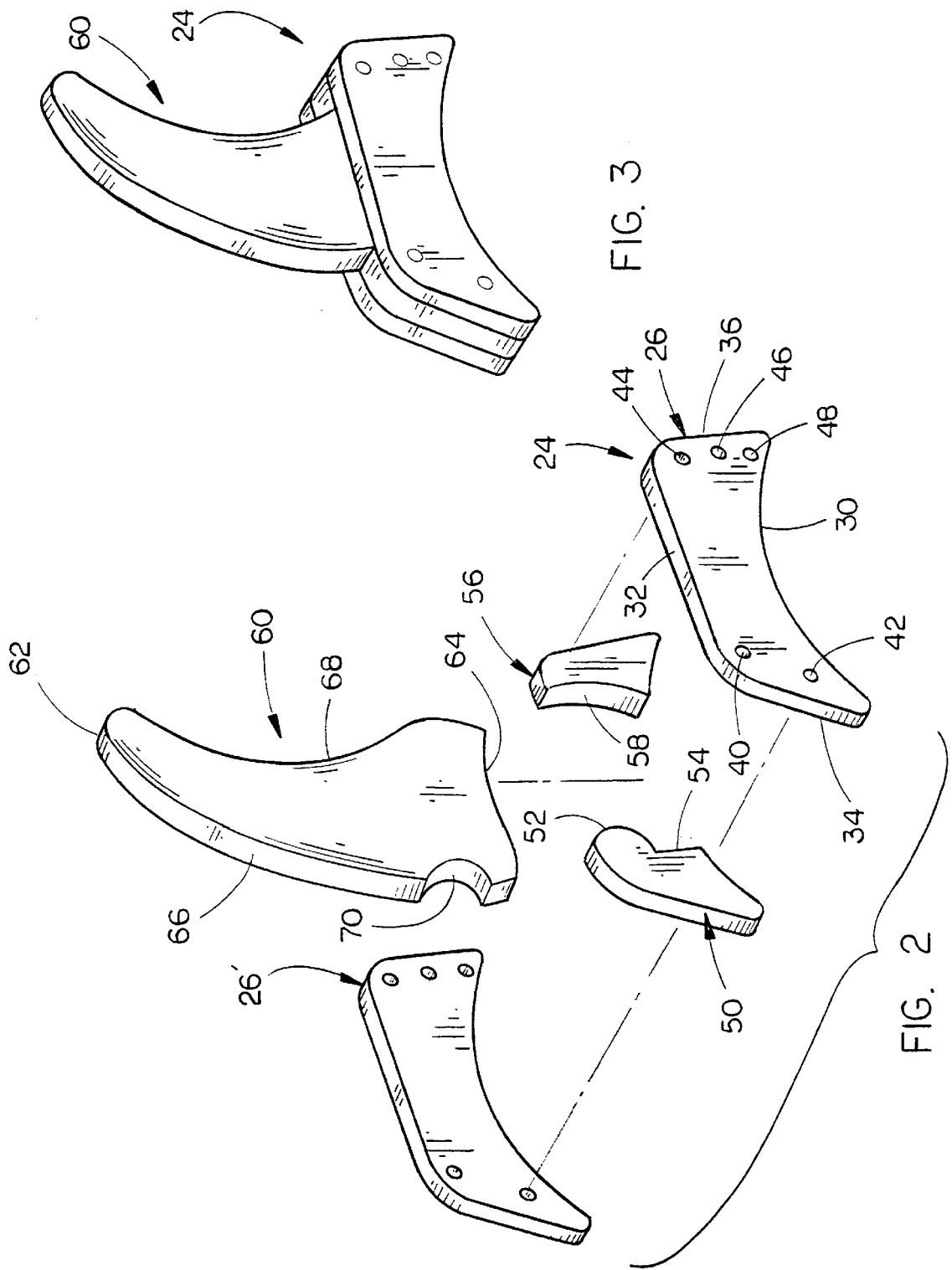

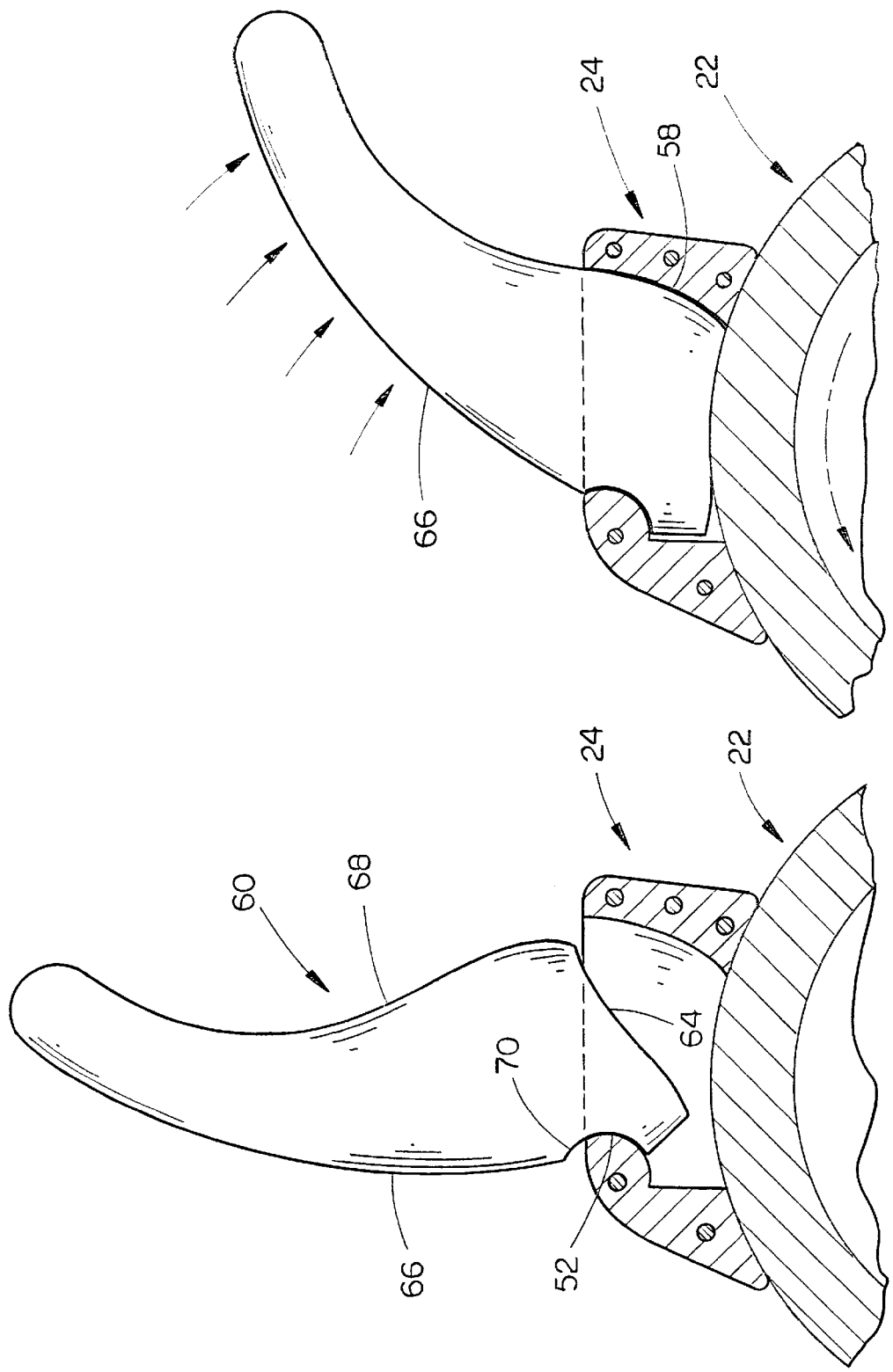

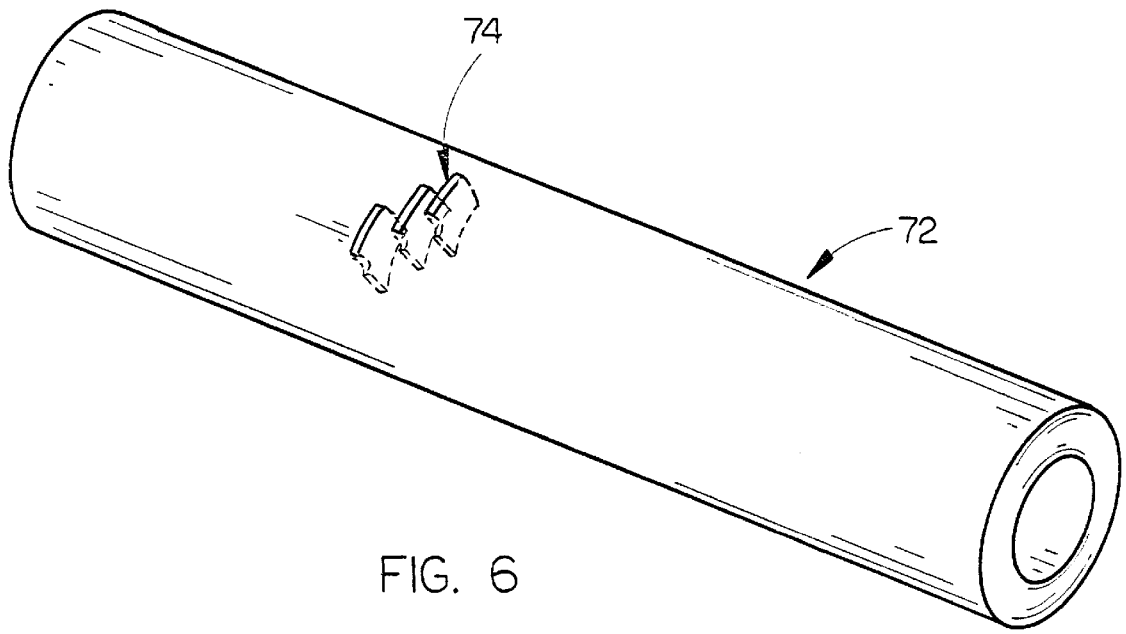
FIG. 6
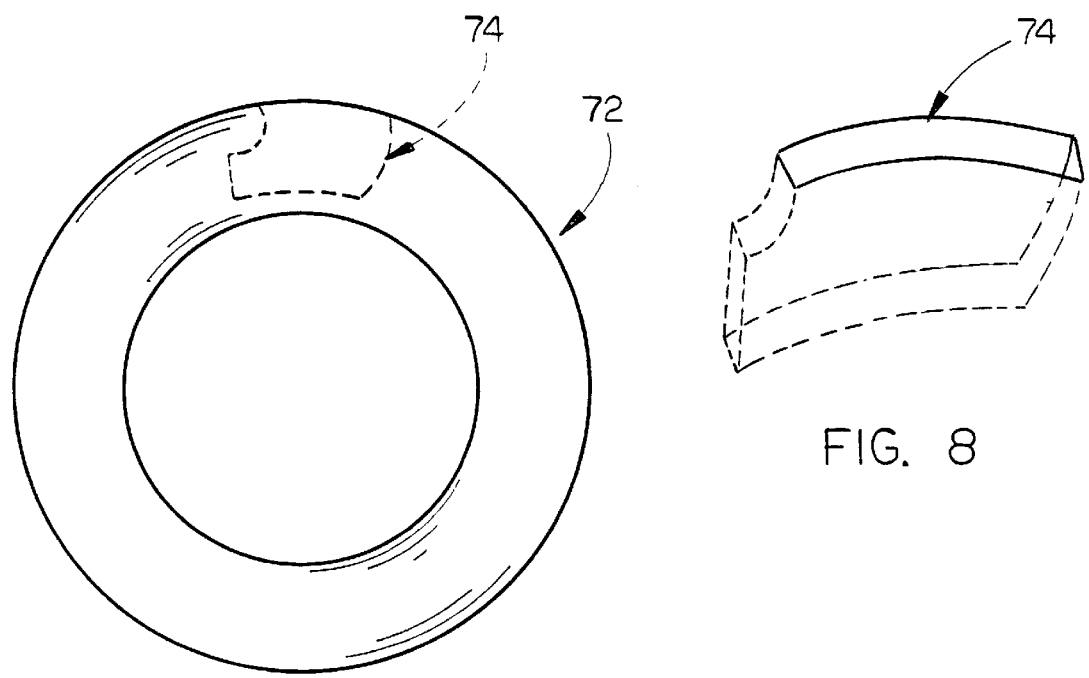
FIG. 7
FIG. 8

ROTOR FOR A BAGGING MACHINE HAVING QUICK CHANGE ROTOR TEETH

BACKGROUND OF THE INVENTION

1. Field of the Invention

This invention relates to an agricultural feed bagging machine and more particularly to an agricultural feed bagging machine which includes a rotor having quick change rotor teeth provided thereon.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the plastic bag is positioned so that the bag is filled. As silage is loaded into the bag, the bagging machine moves away from the filled end of the bag in a controlled fashion in an attempt to achieve uniform compaction of the silage material within the bag.

Most rotors on the bagging machines comprise a plurality of rotor teeth which are welded to the surface of the rotor. A problem exists with the rotor teeth of the prior art bagging machines in that the rotor teeth must be replaced when worn or damaged. Many efforts have been previously attempted in an effort to solve the problems associated with the replacement of the rotor teeth. For example, see U.S. Pat. Nos. 4,907,503 and 5,503,066. Neither of the aforementioned patents discloses any means for replacing the teeth, but simply disclose means for replacing the wear surfaces on the rotor teeth.

SUMMARY OF THE INVENTION

A rotor is provided for an agricultural feed bagging machine with the rotor comprising an elongated, cylindrical body having a horizontally disposed rotational axis. A plurality of sockets are secured to the rotor in a spaced-apart relationship with respect to each other. A rotor tooth is selectively removably received by each of the sockets and the teeth are positively maintained therein during the operation of the bagging machine. If one of the rotor teeth should become worn or damaged, the tooth may be easily replaced in a matter of seconds, since the rotor tooth is only frictionally maintained in the socket. A modified form of the rotor is disclosed wherein the rotor is cast and the sockets are flush in the rotor tube.

It is therefore a principal object of the invention to provide an improved rotor for a bagging machine.

Still another object of the invention is to provide a rotor tooth for a bagging machine which is quickly and easily changeable.

Still another object of the invention is to provide a rotor for a bagging machine with the rotor having a plurality of spaced-apart sockets welded to the exterior surface of the rotor with the sockets having a rotor tooth removably received therein.

These and other objects will be apparent to those skilled in the art.

BRIEF DESCRIPTION OF THE DRAWINGS

FIG. 2 is an exploded perspective view of one of the quick change rotor teeth of this invention;

FIG. 3 is a perspective view of one of the quick change rotor teeth of this invention;

FIG. 4 is a sectional view illustrating a rotor tooth being installed in its respective socket;

FIG. 5 is a sectional view similar to FIG. 4 except that the rotor tooth has been completely received in the socket;

FIG. 6 is a perspective view of a modified form of the rotor;

FIG. 7 is an end elevational view of the rotor of FIG. 6 illustrating one of the sockets cast therein; and FIG. 8 is a view illustrating one of the sockets which are cast into the rotor tube of FIG. 6.

DESCRIPTION OF THE PREFERRED EMBODIMENT

Figure 1:
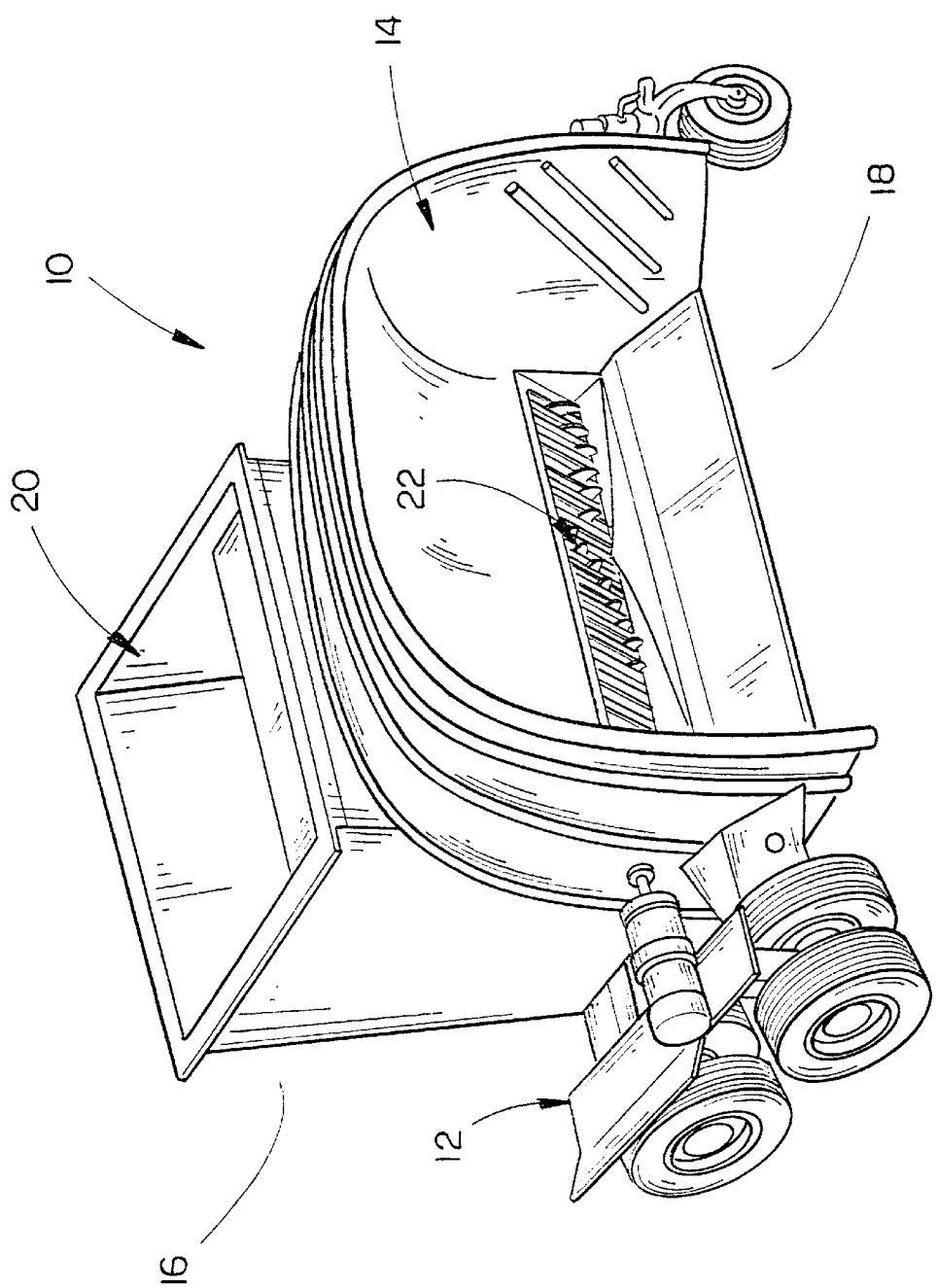
FIG. 1 is a rear perspective view of a bagging machine having the rotor of this invention mounted thereon.

The numeral 10 refers generally to an agricultural bagging machine such as disclosed in U.S. Pat. No. 5,671,594. In most machines 10, a wheeled frame 12 is provided having a tunnel 14 mounted thereon upon which is normally positioned the open mouth of a conventional agricultural bag. Although the preferred embodiment includes a wheeled frame, a non-wheeled frame may also be employed on the bagging machine. The machine 10 also includes a conventional power means for driving the various components of the machine and the same will not be disclosed, since the same does not form a part of the invention. The power means could be an engine mounted on the machine or a power takeoff (PTO) shaft connected to a tractor PTO.

For purposes of description, the bagging machine 10 will be described as including a forward end 16 and a rearward end 18. Bagging machine 10 includes a hopper means 20 or other material receiving means, such as a feed table, conveyor, etc. at the forward end thereof which is adapted to receive the material to be bagged from a truck, wagon, etc. A horizontally disposed rotor 22 is located at the lower end of the hopper means 20 for forcing the material to be bagged into the tunnel 14 and into the bag in conventional fashion.

A plurality of sockets 24 are secured to the exterior surface of the rotor 22 by welding or the like in the desired fashion. The particular pattern of the sockets 24 does not form a part of the invention. At any rate, each of the sockets 24 includes side plates 26 and 26'. Inasmuch as each of the side plates 26 and 26' are identical, only side plate 26 will be described in detail with "'" indicating identical structure on side plate 26'. Side plate 26 includes an arcuate lower end 30 which is positioned adjacent the exterior surface of the rotor 22 and which has an upper end 32 positioned thereabove. Side plate 26 also includes a tapered forward end 34 and a rearward end 36. If the socket 24 is not of a cast one-piece construction, a pair of holes 40 and 42 are provided at the forward end of the side plate with three holes 44, 46 and 48 being provided in the rearward end of the side plate for a purpose to be described hereinafter.

Side plates 26 and 26' are welded to the exterior surface of the rotor 22 in a spaced-apart condition. The numeral 50 refers to a spacer/locking plate which is positioned between the forward ends of side plates 26 and 26' and which has an arcuate pivot surface 52 provided at the upper rearward end thereof. As seen in the drawings, spacer/locking plate 50 includes a rear surface 54 which extends downwardly from the lower end of pivot surface 52. If the socket is not fabricated of a one-piece cast construction, the openings 40 and 42 in side plate 26 and the openings 40' and 42' in side plate 26' serve as plug welds so that the spacer/locking plate 50 will be maintained between the side plates 26 and 26'.

The numeral 56 refers to a second spacer/locking plate which is positioned between the rearward ends of the side plates 26 and 26' and which has an arcuate forward end 58. If the socket is not of the cast one-piece construction, the openings 44, 44', 46, 46', 48 and 48' may be plug welded in the side plates 26 and 26' to maintain the spacer/locking plate 56 in position between the side plates 26 and 26'.

The numeral 60 refers to a rotor tooth which is quickly and easily removably positioned in each of the sockets 24. Rotor tooth 60 includes an outer end 62 and a slightly arcuate inner end 64. Tooth 60 is provided with an arcuate leading edge 66 and an arcuate trailing edge 68. The inner forward end of the tooth 60 is provided with an arcuate (semi-circular) recess 70 which is complimentary in shape to the pivot surface 52 on spacer/locking plate 50.

When it is desired to mount a tooth 60 in a socket 24, the tooth 60 is installed in the socket 24, as illustrated in FIG. 4. The tooth 60 is tipped forwardly in the manner illustrated in FIG. 4, and the pivot surface 70 is brought into contact with the pivot surface 52. The tooth 60 is then pivotally moved rearwardly from the position of FIG. 4 to the position of FIG. 5, until the lower rearward end of tooth 60 is positioned adjacent the forward end 58 of spacer/locking plate 56. The lower or inner end of tooth 60 is in frictional engagement with the inner surfaces of side plates 26 and 26' and the tooth is driven into the position of FIG. 5 with a hammer or the like. When the rotor is rotated in the direction illustrated by the arrows in FIG. 5, force is applied to the forward end 66 of the tooth 60, as indicated by the arrows in FIG. 5.

In the event that the tooth 60 becomes worn or damaged, it may be easily replaced by simply taking a hammer and driving the outer end of the tooth 60 forwardly from the position of FIG. 5 to the position of FIG. 4. The tooth 60 may then be removed from the socket 24 and a new tooth 60 mounted therein.

FIGS. 6–8 illustrate a modified version or embodiment of the rotor of this invention. In FIG. 6, the numeral 72 refers to a cast rotor which has a plurality of sockets 74 cast therein with the sockets 74 having the same shape as the sockets 24. FIG. 6 illustrates only a few of the sockets 74 being provided in the rotor 72, but it should be understood that the entire surface of the rotor 72 would have the sockets 74 cast therein. The rotor teeth 60 are installed in the sockets 74 in the manner in which the teeth 60 are installed in the sockets 24. The teeth 60 are removed from the sockets 74 in the same manner as described hereinabove.

None of the prior art designs can achieve the design features of the quick change tooth disclosed herein. The rotor tooth and special socket arrangement described herein permits many options previously not available. As stated, if a tooth is damaged, it may be simply replaced. If a tooth wears out, it may be simply replaced. The teeth can also be made wider for corn silage and narrower for long chopped feeds. The teeth may have material strips of chrome and other hard-wearing alloys welded to them. Because the burned shaped tooth is very inexpensive, it is an important feature to have the entire tooth quick-changeable.

Thus it can be seen that the invention accomplishes at least all of its stated objectives.

I claim:

1. A rotor for a bagging machine, comprising:

an elongated, cylindrical body having a horizontally disposed rotational axis;

a plurality of sockets secured to said cylindrical body in a spaced-apart relationship with respect to each other;

and a rotor tooth selectively removably received by each of said sockets;

each of said sockets having a pivot surface provided therein;

said rotor tooth having a bearing surface which engages said pivot surface to yieldably maintain said tooth in said socket.

2. A rotor for a bagging machine, comprising:

an elongated, cylindrical body having a horizontally disposed rotational axis;

a plurality of sockets secured to said cylindrical body in a spaced-apart relationship with respect to each other;

and a rotor tooth selectively removably received by each of said sockets;

each of said sockets comprising first and second horizontally spaced-apart, upstanding side plates having forward and rearward ends; a leading edge; a trailing edge; a lower end and an upper end;

a first locking plate positioned between said side plates at the forward end thereof and being secured thereto;

a second locking plate positioned between said side plates at the rearward end thereof and being secured thereto;

said tooth having inner and outer ends, the inner end of said tooth being removably received between said side plates between said first and second locking plates and being in engagement therewith.

3. The rotor of claim 2 wherein said first locking plate has a pivot surface provided thereon and wherein said tooth has a pivot surface thereon for engagement with the pivot surface on said locking plate.

4. The rotor of claim 3 wherein said inner end of said tooth is in frictional engagement with said side plates.

5. The rotor of claim 3 wherein said pivot surface on said first locking plate comprises a rearwardly extending protrusion and wherein said pivot surface on said tooth comprises an arcuate recess formed in the forward end thereof which receives said pivot surface on said first locking plate.

6. A rotor for a bagging machine, comprising:

an elongated, cylindrical body having a horizontally disposed rotational axis;

a plurality of sockets provided on said cylindrical body in a spaced-apart relationship with respect to each other;

and a rotor tooth selectively removably received by each of said sockets;

said sockets being cast into said cylindrical body and being embedded therein.

7. The rotor of claim 6 wherein said rotor tooth is frictionally received by each of said sockets.

8. The rotor of claim 6 wherein each of said sockets has a pivot surface provided therein and wherein said rotor tooth has a bearing surface which engages said pivot surface to yieldably maintain said tooth in said socket.

* * * * *